March 9, 1971 D. O. MYERS 3,568,367
GLASS DRILLING APPARATUS
Filed June 10, 1968 5 Sheets-Sheet 5
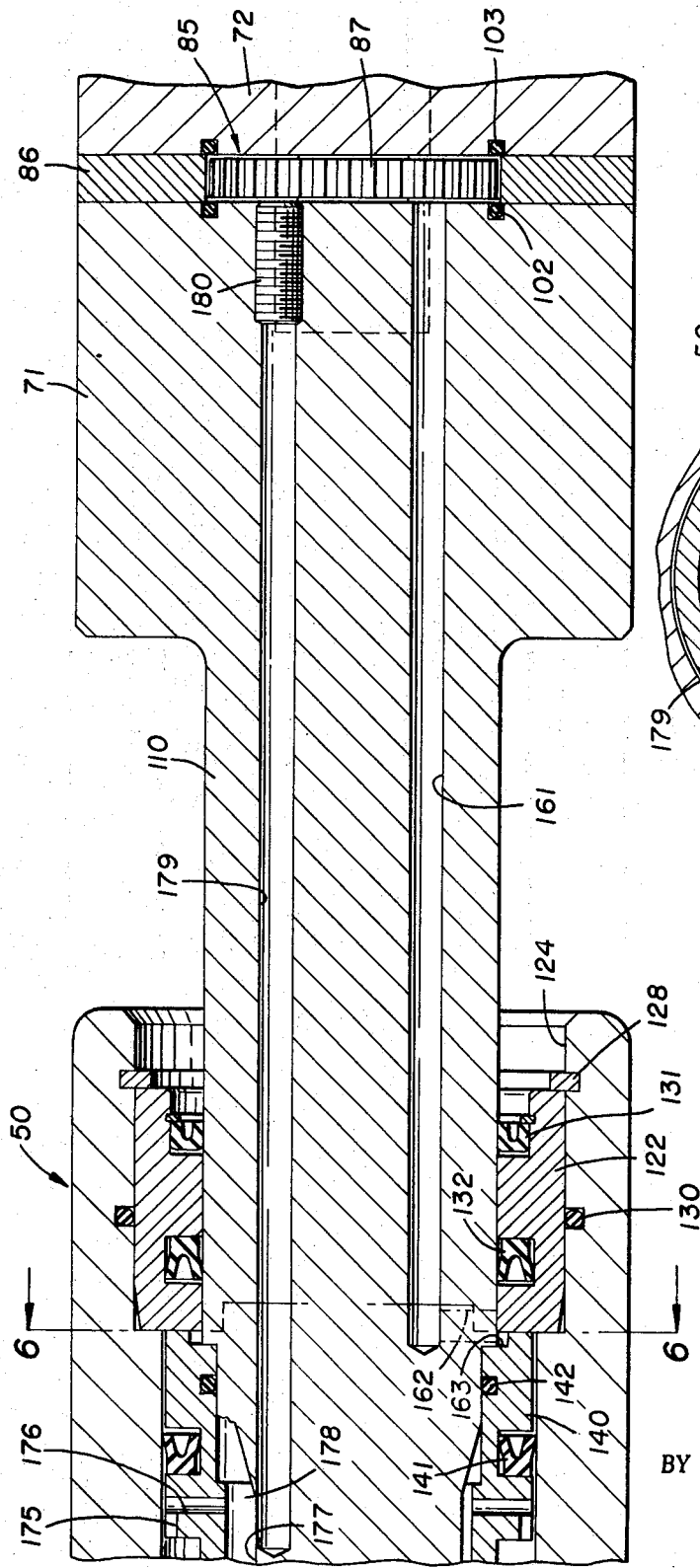
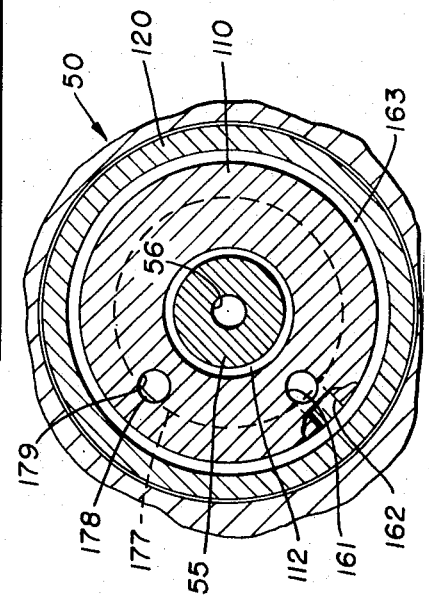
INVENTOR.
DANIEL O. MYERS
BY Hamilton, Cook,
Renner & Kenner
ATTORNEYS United States Patent Office 3,568,367
Patented Mar. 9, 1971

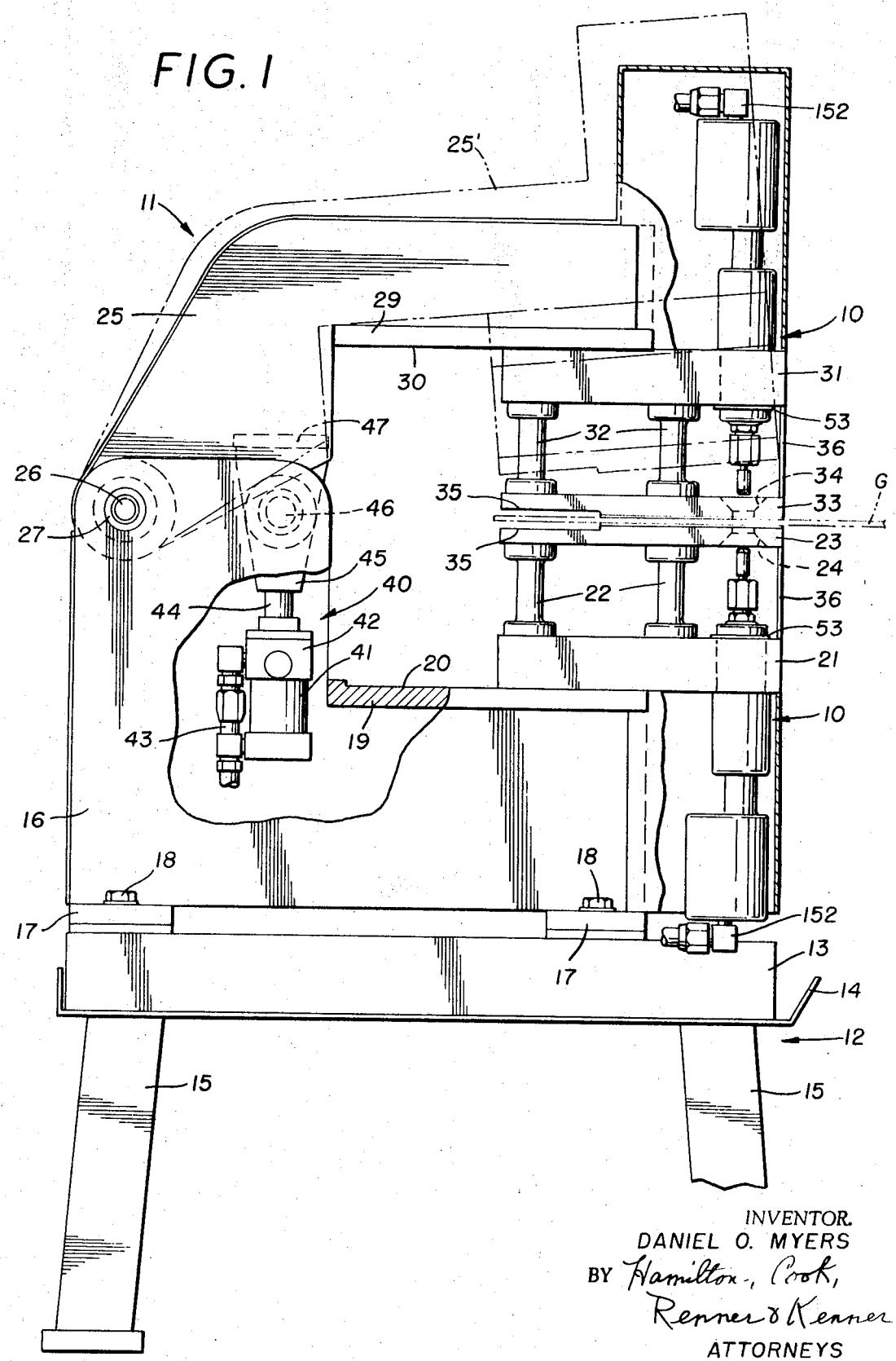

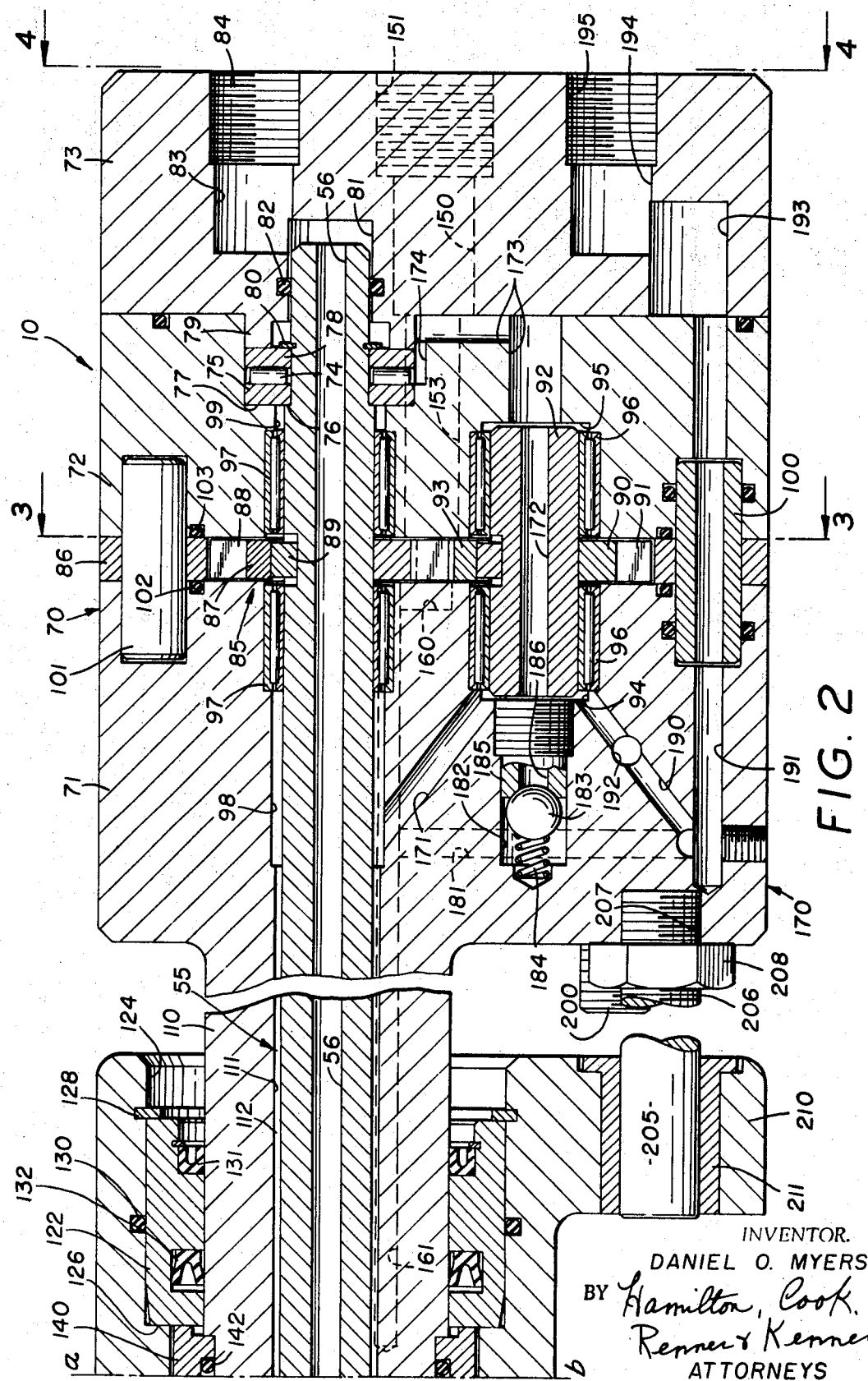

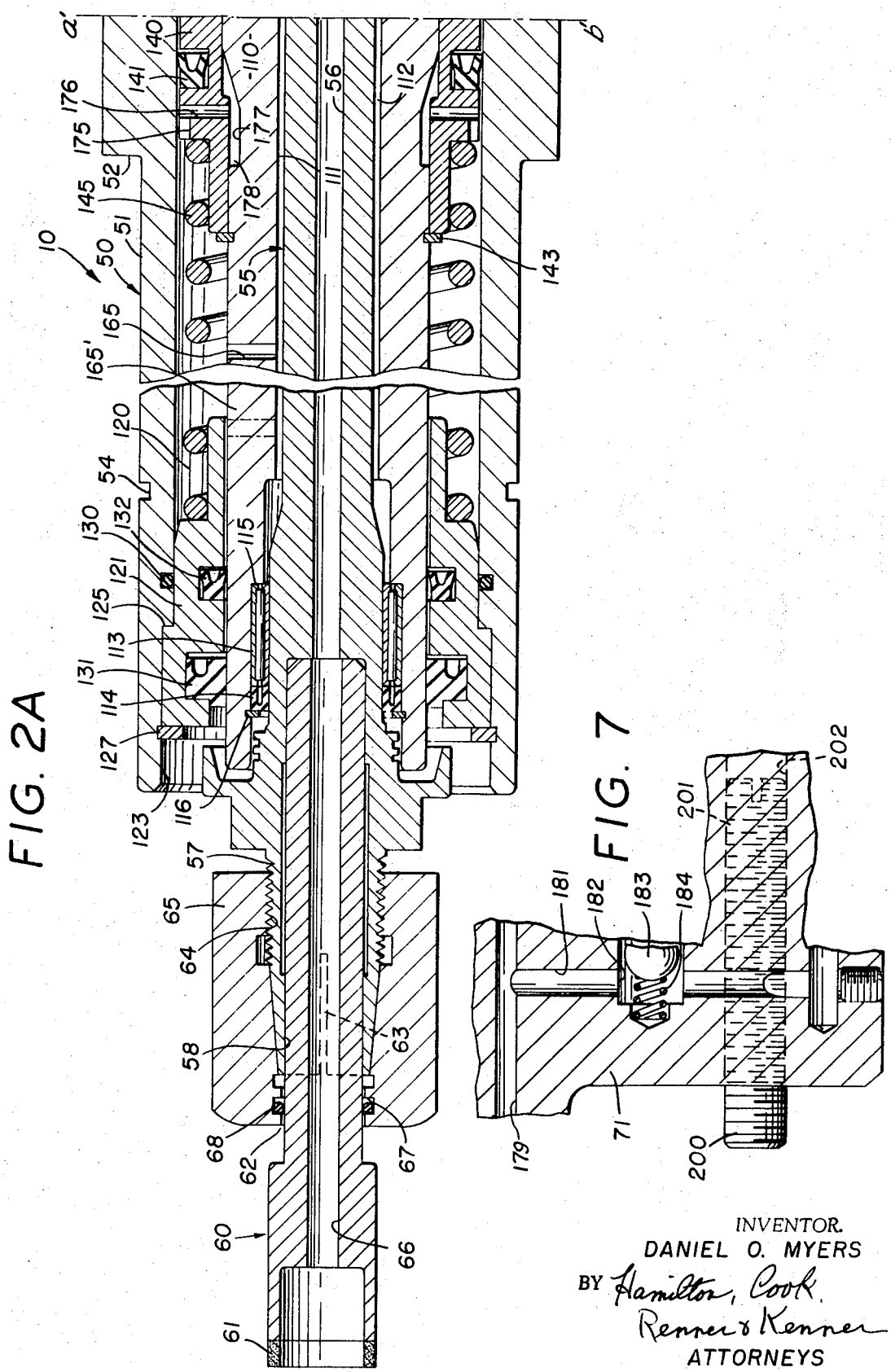

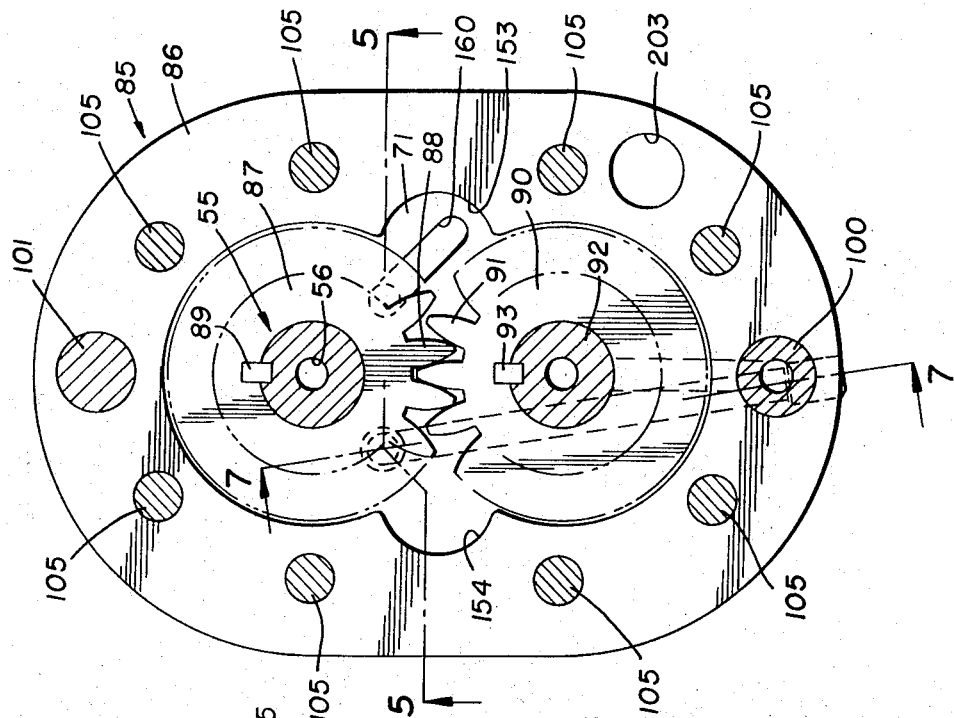
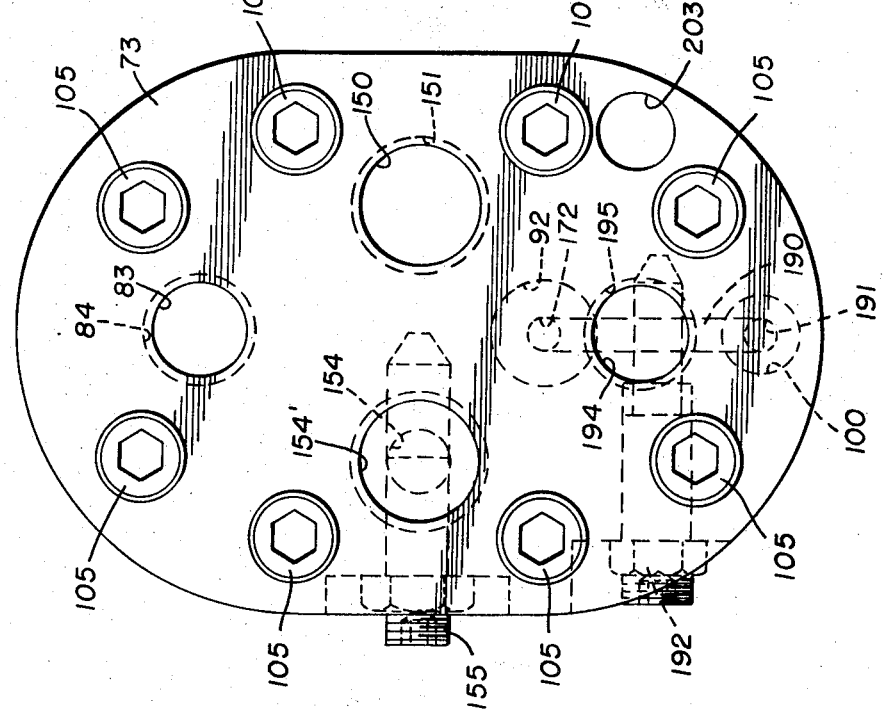

3,568,367
GLASS DRILLING APPARATUS
Daniel O. Myers, Mansfield, Ohio, assignor to Akron Crane & Conveyor Company, Akron, Ohio
Filed June 10, 1968, Ser. No. 735,845
Int. Cl. B24b 7/00
U.S. Cl. 51—81                                6 Claims

ABSTRACT OF THE DISCLOSURE

A compact glass drilling apparatus having a hydraulic motor rotating a bit at a selected speed and driving hydraulic mechanism to rapidly position the bit with respect to the glass to be drilled and to selectively control the rate of travel of the bit through the glass and having mechanism separately feeding a fluid lubricant to the bit.

BACKGROUND OF THE INVENTION

Glass drilling machines have two opposed, axially aligned drills which are moved toward each other to alternately bore opposite surfaces of the glass workpiece are well-known in the art. Such processing has been found necessary because drilling entirely through glass from one side almost invariably results in chipping or breaking when the drill penetrates the opposite side. This problem is totally eliminated by drilling part way from one side, retracting the drill, and simultaneously or subsequently drilling a concentric bore from the other side to complete the hole.

Existing machines adapted for glass drilling commonly employ a motor and belt or chain to rotatably drive a shaft to which a drilling bit is attached. The shaft and bit normally carry associated hydraulic mechanisms which move the bit relative to the glass workpiece in preparation for and during the cutting operation. In addition, suitable channels are provided to supply a lubricant to the bit, which may or may not be the same fluid operating the hydraulic mechanisms. Frequently, electric components, such as switches and relays, have also been employed to serve control and actuation functions for the various hydraulic mechanisms. Therefore, a single drilling machine employing two opposed drills normally requires several power and control systems which have the disadvantage of being quite complex and bulky. In some instances, efforts have been made to combine the hydraulic mechanisms and lubricating systems, as by using water, which is a suitable lubricant, as the hydraulic mechanism fluid; however, this restricts the operating pressures of the hydraulic mechanisms, may produce inconsistent pressures, and has deleterious effects on bearings and other components.

Recently, there has developed a need for apparatus capable of drilling a plurality of holes in a single glass workpiece in close proximity. For any degree of production economy, it is necessary that these holes be drilled simultaneously. Due to bulkiness and other problems mentioned above, attempts to adapt existing devices to this problem have presented difficulties. In an effort to eliminate some of these problems, large castings mounting a plurality of drills and serviced by a single, large hydraulic system remotely positioned have been devised. However, these devices have suffered from the inconvenience and handling problems attendant the use of a massive casting and the maintenance and servicing problems associated with the operation of a large, remote hydraulic control system.

SUMMARY OF THE INVENTION

It is therefore an object of the present invention to provide glass drilling apparatus having the important operating and control mechanisms located in a single housing associated with the glass cutting bit. Another object of the invention is to provide such apparatus in a small, compact housing which will allow for the drilling of a plurality of holes in close proximity to each other. A further object of the invention is to provide glass drilling apparatus having a hydraulic motor, employing an optimum fluid, which rotates the bit and drives hydraulic mechanism to position the bit with respect to and to control its travel through a glass workpiece.

It is still a further object of the invention to provide glass drilling apparatus in which bit rotating speed, rate of travel of the bit through the glass workpiece, and bit depth penetration into the workpiece can be quickly and easily adjusted. An additional object of the invention is to provide drilling apparatus capable of drilling a plurality of holes rapidly and with a minimum of operator supervision. Still another object of the invention is to provide apparatus which is relatively uncomplex, inexpensive, and requires a minimum of maintenance and upkeep.

In general, glass drilling apparatus according to the concept of the present invention contemplates a housing adapted for mounting in opposed, axially aligned relation with a second identical apparatus and closely proximate to additional pairs of the apparatus, said housing containing a hydraulic motor rotating a bit at a selected speed and driving hydraulic mechanism to rapidly position the bit with respect to the glass to be drilled and to selectively control the rate of travel of the bit through the glass and containing mechanism to separately feed a fluid lubricant to the bit.

DESCRIPTION OF THE DRAWINGS

FIG. 1 is a side elevation view of an exemplary mounting frame with portions broken away to show glass drilling apparatus according to the concept of the present invention with a glass workpiece positioned for drilling and showing the mounting frame in chain lines in the open position for insertion and removal of glass workpieces.

FIG. 2 is a partial section view of the rear portion of glass drilling apparatus embodying the concept of the present invention.

FIG. 2a is a partial section view of the front portion of the glass drilling apparatus constituting a continuation of FIG. 2 joined at the chain lines a–b and showing a glass drilling bit mounted therein.

FIG. 3 is a section view taken substantially along line 3—3 of FIG. 2, and showing particularly the hydraulic motor.

FIG. 4 is an end elevation view taken substantially along line 4—4 of FIG. 2 and showing particularly the external attachments and adjustment mechanisms.

FIG. 5 is a fragmentary section view taken substantially along line 5—5 of FIG. 3.

FIG. 6 is a fragmentary section view with portions broken away taken substantially along line 6—6 of FIG. 5.

FIG. 7 is a fragmentary section view taken substantially along line 7—7 of FIG. 3.

DESCRIPTION OF A PREFERRED EMBODIMENT

Referring to the drawings and particularly to FIG. 1 thereof, glass drilling apparatus according to the present invention, generally indicated by the numeral 10, is advantageously mounted, as shown, in opposed, axially aligned pairs. For exemplary purposes, a single pair of the drilling apparatus 10 is positioned in a mounting frame, generally indicated by the numeral 11, which may have a somewhat C-shaped configuration. The mounting frame 11 may be provided with a stand, generally indicated by the numeral 12, having a base 13 and underlying pan 14 supported by downwardly extending legs 15.

Upwardly of base 13, the mounting frame 11 has a lower housing 16 which is provided with flanges 17 which are attached to the base by cap screws 18 or other suitable fastening means. An upper surface of lower housing 16 supports a platen 19 having a flat, smooth upper surface 20 which seats and retains a lower drill mounting plate 21. The lower drill mounting plate 21 is rigidly attached to surface 20 of platen 19, as by bolts (not shown), and is bored to receive and selectively axially and rotationally hold a drill apparatus 10 in place. A pair of spacers 22 position a lower clamp plate 23 preferably a distance above and parallel to lower drill mounting plate 21 and are secured thereto. The spacers 22 provide clearance for the advance and retraction of a portion of the drill apparatus 10, as described more fully hereinafter. The lower clamp plate 23 is provided with an opening, such as tapered bore 24, which is of sufficient size to allow passage of conventional glass drilling bits.

An upper housing 25 is mounted in pivotally cooperating arrangement with the lower houisng 16. This mounting may be effected by the use of a pivot pin 26 and bearing 27, or other comparable fastening elements, carried by the lower housing 16 and supporting upper housing 25. The upper housing 25, in a similar but inverted relation, has a surface supporting a platen 29 having a flat, smooth lower surface 30 which seats and retains an upper drill mounting plate 31. The upper drill mounting plate 31 is rigidly attached to surface 30 of platen 29, as by bolts (not shown), and is bored to receive and selectively axially and rotationally hold a drill apparatus 10 in place. A pair of spacers 32 position an upper clamp plate 33 preferably a distance below and parallel to upper drill mounting plate 31 and are secured thereto. The spacers 32 provide clearance for the advance and retraction of a portion of the drill apparatus 10, as mentioned in conjunction with the spacers 22. The upper clamp plate 33 is provided with an opening, such as tapered bore 24, which is of sufficient size to allow passage of conventional glass drilling bits.

The lower clamping plate 23 is adapted to support a glass workpiece G which is held firmly in a predetermined position by the upper clamping plate 33 which is pivoted into engaging relation with the movement of upper housing 25 about the pivot pin 26. In order to prevent application of what might be damaging forces on the glass workpiece G during pivotal closing of the upper housing, from chain line position 25' to solid line position 25, the inner portions of clamping plates 23, 33 may be provided with recesses 35 of suitable length to give appropriate pressure relief. As a safety measure to prevent drilled particles of the glass workpiece G from being thrown outwardly so that they might strike an operator of the apparatus, a shield 36 may be installed between each of the clamping plates 23, 33 and their respective mounting plates 21, 31.

If it is desired to automate the pivotal motion of upper housing 25, a hydraulic drive, generally indicated by the numeral 40, may be installed between lower housing 16 and upper housing 25. As shown, the hydraulic drive 40 has a hydraulic cylinder 41 with a mounting plate 42 attached to the lower housing 16. A suitable hydraulic line 43 is attached to cylinder 41 and a controlled flow of fluid is provided from a remote source (not shown) according to conventional practices well known to persons skilled in the art. The hydraulic cylinder 41 has an axially extensible shaft 44 with an attached collar 45. The collar 45 rides on a pin 46 which is attached to upper housing 25 as by the clevis bracket 47. Thus, extension and retraction of shaft 44 of hydraulic drive 40 pivots the upper housing 25 about the pivot pin 26 and into and out of contact with a workpiece G for engagement and holding during drilling and for release during removal and substitution of an additional workpiece to be drilled.

As previously indicated, each of the pair of drilling apparatus 10 shown in FIG. 1 are identical; therefore, the following description will be directed to a single drilling apparatus 10. Referring now to FIGS. 1, 2, and 2a, a drill 10 has a cylinder housing, generally indicated by the numeral 50, which is inserted in one of the drill mounting plates 21, 31 and has an engaging surface 51. The cylinder housing 50 is axially fixed in its mounting plates 21, 31 by an enlarged shoulder 52 at one extremity of engaging surface 51 and a snap ring 53 (FIG. 1) at the other extremity which is accommodated in a groove 54.

Referring particularly to FIGS. 2 and 2a, a central spindle or shaft generally indicated by numeral 55, is positioned interiorly of and concentrically with the cylinder housing 50. The shaft 55 has a central bore 56 extending the entire length thereof. At its forward end (FIG. 2a), the shaft 55 has a receiver portion 57 which may be slightly enlarged and which extends axially outwardly of the cylinder housing 50 and has a bore 58 which retains a conventional glass drilling bit, generally indicated by the numeral 60. As shown, the glass drilling bit 60 has a projecting cutting lip 61 at one extremity and an extending shank 62 which matingly engages the bore 58 of receiver portion 57 of shaft 55. In order to nonrotatably affix drilling bit 60 to shaft 55, the receiver portion 57 of shaft 55 may be bifurcated by forming axial slots 63 and provided with external threads 64 about a portion of its periphery to receive a collet nut 65 which serves to tighten the collet thus formed about shank 62 of bit 60. The bit 60 is provided with a central bore 66 which communicates with the bore 56 of shaft 55 to supply a lubricating and cooling fluid to the cutting lip 61. The collet nut 65 may be provided with an internal notch 67 to receive an O-ring 68 which provides a seal for lubricating fluid directed to the drill bit 60.

Referring now to FIG. 2, the shaft 55 extends rearwardly of the cylinder housing 50 and into an attached motor housing, generally indicated by the numeral 70. The motor housing 70 may have three separable sections for ease of construction and maintenance including a forward motor plate 71, an inter motor plate 72, and a rear motor plate 73 which are appropriately joined to form a single unit. The shaft 55 is journaled near its rearward extremity in a thrust bearing 74 having a forward race 75 which engages a shoulder 76 in shaft 55 and a bore 77 in inter motor plate 72 and having a rearward race 78 which is restrained by an annular projection 79 on rear motor plate 73 and a snap ring 80 on the shaft 55. Thus, shaft 55 is restrained from axial movement in either direction relative to the motor housing 70.

Referring now to FIGS. 2 and 4, the shaft 55 extends part way into a bore 81 in rear motor plate 73 which is sealed from the thrust bearing 74 by an O-ring 82 inset in plate 73 and engaging shaft 55. The bore 81 communicates with a lubricant and coolant input bore 83 in the extremity of rear motor plate 73 and is provided with threads 84, or other similar adaptor, for attaching a hose connected to a remote, controlled source of lubricating and cooling fluid, such as water (not shown), which travels the bore 56 in spindle or shaft 55 under moderate pressure to the drilling bit 60.

The spindle or shaft 55 carries forwardly of the thrust bearing 74 a hydraulic motor, generally indicated by the numeral 85. Referring particularly to FIGS. 2 and 3, the hydraulic motor 85 consists of a gear plate 86 interposed between the front motor plate 71 and the inter motor plate 72 and having a main gear 87 with projecting gear teeth 88 which is nonrotatably fixed on shaft 55 by a suitable key 89. A second idler gear 90 is mounted in the gear plate 86 and has gear teeth 91 matingly engaging the gear teeth 88 of main gear 87. The idler gear 90 is mounted on an idler shaft 92 and nonrotatably fixed thereon by a key 93. Idler shaft 92 may be of limited length extending into bores 94 and 95 in the forward motor plate 71 and the inter motor plate 72, respectively, and journaled in bearings 96 in both bores. The shaft 55 is similarly supported by bearings 97 located in bores 98 and 99 provided in the forward motor plate 71 and the inter motor plate 72, respectively, to accommodate the shaft 55.

In order to ensure precise positioning between the gear plate 86 and the forward and inter motor plates 71, 72 for registration with channels hereinafter detailed, alignment pins 100 and 101 extend through the plate 86 and into the motor plates 71, 72. The gear plate 86 is sealed outwardly of main gear 87 and idler gear 90 as to forward motor plate 71 and inter motor plate 72 by O-rings 102 and 103, respectively. The entire motor housing is held together as a single unit by a plurality of capscrews 105, or other comparable fasteners, which extend from the back surface of rear motor plate 73 (FIG. 4), through the rear motor plate 73, through the inter motor plate 72, through the gear plate 86 (FIG. 3), and into the forward motor plate 71 where they are threadedly secured (not shown).

The front motor plate 71 has an extending cylinder 110 having a bore 111 which receives shaft 55, but is sufficiently larger to form an annular channel 112 therearound. Preferably near the extremity of cylinder 110, the shaft 55 is journaled in bearings 113 and the annular channel 112 is terminated by a sealing ring 114. The bearings 113 and sealing ring 114 may be conveniently axially restrained in cylinder 110 by a shoulder 115 and snap ring 116 located internally of cylinder 110.

The cylinder 110, internally carrying the shaft 55, is supported and operatively linked for axial movement within the fixed cylinder housing 50. The cylinder 110, having an external diameter less than the internal diameter of cylinder housing 50, forms in conjunction with housing 50 an annular chamber 120. The cylinder 110 is supported within cylinder housing 50 and the annular chamber 120 is terminated at either end by a forward sleeve 121 and a rear sleeve 122. The sleeves 121, 122 may be secured against axial movement in the cylinder housing 50 by means of counterbores 123 and 124 which form shoulders 125 and 126 internally and snap rings 127 and 128 which are positioned externally nearer the extremities of cylinder housing 50. Each sleeve 121, 122 is sealed radially outwardly as to cylinder housing 50 by O-rings 130 and radially inwardly as to cylinder 110 by dirt wipers 131 and sealing rings 132, thereby maintaining the sealed integrity of annular chamber 120.

Interposed between cylinder housing 50 and cylinder 110, an annular piston 140 is mounted for movement within the annular chamber 120. The piston 140 is sealed outwardly with the cylinder housing 50 by a sealing ring 141 (FIG. 2a) and inwardly with the cylinder 110 by an O-ring 142 (FIG. 2). The forward edge of piston 140 seats against a snap ring 143 in cylinder 110, so that the entire motor housing 70, cylinder 110, shaft 55, and associated components are moved forward relative to cylinder housing 50 when the piston 140 is advanced from the position depicted in FIGS. 2, 2a, and 6. The piston 140 is normally maintained in the position shown by a compression spring 145 which engages the rear of forward sleeve 121 and the forward end of piston 140, thus forcing the piston 140 rearwardly against rear sleeve 122.

The rotation of drill 60 is powered by the hydraulic motor 85 which receives a suitable hydraulic fluid from a remote pump (not shown) through a bore 150 in the extremity of rear motor plate 73 (FIGS. 2 and 4) which may be provided with threads 151, or other similar adaptor, to receive a connecting hose 152 (FIG. 1). The bore 150 communicates with a fluid supply conduit 153 extending through inter motor plate 72 and into gear plate 86 and introducing fluid on the right side of gears 87, 90 and internally of gear plate 86, as viewed in FIG. 3. A portion of the fluid introduced actuates the gears 87, 90 to rotate shaft 55 carrying drill 60, thereby flowing through gear teeth 88 and 91 to a sump conduit 154, similar to supply conduit 153, on the left side of gears 87, 90 as viewed in FIG. 3 through inter motor plate 72 to a sump outlet bore 154' on the extremity of rear motor plate 73. The sump outlet bore is connected in a suitable manner to a remote sump (not shown) which may service a plurality of drills 10.

As best seen in FIG. 4, an adjustable valve 155 extends into the sump conduit 154 in order that the sump back pressure may be readily varied to control the speed of the hydraulic motor 85. Thus, adjustable valve 155 is employed to vary the speed of spindle or shaft 55 which carries the drill 60, thereby providing compensation for different types of drills 60 or different compositions of the glass workpiece G.

Some of the fluid introduced to gear plate 86 via supply conduit 153 deviates into groove 160 in the forward motor plate 71 (seen in FIG. 3) and is directed into an elongated input duct 161 extending through front motor plate 71 and into the cylinder 110 to position cylinder 110 relative to cylinder housing 50. Referring particularly to FIGS. 5 and 6, the input duct 161 communicates with an input port 162 opening on the surface of cylinder 110 and positioned at the juncture between the piston 140 and the rear sleeve 122, where a shallow annular groove 163 may be provided in piston 140. Thus, fluid introduced under sufficient pressure forces the piston 140 forward in the cylinder housing 50 compressing the spring 145.

During the early stages of the movement of the cylinder 110 carrying spindle 55, it is highly desirable that the drill 60 move forward rapidly to a position proximate the glass workpiece G, thus tending to minimize the operating cycle of the drill 10. This is achieved by providing two relief paths for fluid in the annular chamber 120 between the forward sleeve 121 and the piston 140.

Referring particularly to FIG. 2a, a first fluid relief path for fluid in annular chamber 120 is established through the cylinder 110. A port 165 appropriately positioned in the cylinder 110 connects the annular chamber 120 with the annular channel 112 surrounding shaft 55. The annular channel 112 terminates at the bearings 97 in bore 98 of the forward motor plate 71. Fluid from the annular channel 112 is directed through an output and control assembly, generally indicated by the numeral 170 (FIG. 2). The output and control assembly 170 has an angled channel 171 in the forward motor plate 71 which communicates with the annular channel 112 and the bore 94 in forward motor plate 71 which receives the idler shaft 92. The fluid then passes through a bore 172 in idler shaft 92 to an L-shaped after output channel 173 which may have a connecting channel 174 providing lubricant to bearing 74 and which connects to the sump conduit 154.

A second fluid relief path for fluid in annular chamber 120 is provided through the piston 140. Referring particularly to FIGS. 2, 2a, 5 and 6, the piston 140 is provided with an outward recess 175 connected to a radial output port 176 that communicates with what may be a relatively narrow undercut 177 in cylinder 110 forming an annular output chamber 178. The annular output chamber is connected to an elongated output duct 179 which is directed through cylinder 110 and forward motor plate 71 toward the sump side of the hydraulic motor 85; however, direct ingress to the sump conduit 154 is blocked by the plug 180 inserted in the rear face of forward motor plate 71 (FIG. 5.)

Referring now to FIGS. 2 and 7, the output and control assembly 170 has a second path with valve conduit 181 which extends through a valve chamber 182 having a ball valve 183 which is loaded by a spring 184 against a valve seat 185. The valve seat 185 has a bore 186 (FIG. 2) which connects with the bore 172 in idler shaft 92 leading to sump conduit 154. The valve 183 remains closed during advance of the drill and opens to allow rapid retraction by supplying fluid on the forward side of piston 120 through the second fluid relief path. The valve conduit 181 branches into a flow control valve conduit 190 and a sensor conduit 191. The flow control valve conduit 190 connects with the bore 94 in forward motor plate 71 and the bore 172 in idler shaft 92 and subsequently to sump conduit 154. A flow control valve 192 (FIGS. 2 and 4) extends into flow control valve conduit 190 and is adjustable to control the rate of fluid flow therethrough for a purpose to be hereinafter detailed. The sensor conduit 191 extends rearwardly through the alignment pin 100 to bores 193 and 194 in the rear motor plate 73, the latter of which may have threads 195, or another similar adaptor, for connecting a hose (not shown) to a remote sensor (not shown).

As indicated by the above description, both relief paths operate to allow a rapid advance of the bit 60 to a position proximate the glass workpiece G. However, a slower rate of advance of the bit 60 is necessitated during the actual drilling operation. This retardation is accomplished by a blocking of the first relief path through cylinder 110 which takes place when the cylinder 110 advances in the cylinder housing 50 a sufficient distance so that the port 165 reaches a position under the forward sleeve 121, as exemplified by the chain line position 165' in FIG. 2a. From that position forward only the second relief path operates, thereby slowing the rate of advance to a suitable drilling speed. This drilling advance rate can be adjusted by the flow control valve 192 to account for variations in the composition of the glass workpiece and the characteristics of the bit 60, the valve 192 being of little operating significance during the rapid advance portion of the forward travel. When the drill reaches its preset depth, as hereinafter described, the pressure in the second relief path approaches zero and is so reflected in the sensor conduit 191. The remote sensor may be connected to the pump supplying input conduit 153 to stop the flow of fluid at this time, employing control mechanisms well-known to persons skilled in the art. When the fluid input to drill 10 is thus stopped, the drill bit 60 ceases rotation and the coil spring 145 returns the piston 140, with attached cylinder 110, to its original position, depicted in FIG. 2, contacting the rear sleeve 122 in cylinder housing 50.

In order to control the distance cylinder 110, with attached shaft 55 and bit 60, moves forward in relation to cylinder housing 50, the forward motor plate 71 may house a depth adjustment pin 200 (FIGS. 2 and 7) which projects outwardly and engages cylinder housing 50 to limit forward travel. The depth adjustment pin may have threads 201 engaging a tapped bore 202 in the forward motor plate 71. The adjustment pin 200 can be manipulated from the rear of drill 10 by an access bore 203 extending through the gear plate 86 (FIG. 3), inter motor plate 72, and terminating on the extremity of rear motor plate 73 (FIG. 4). The depth adjustment pin 200 allows control of the depth that each bit 60 penetrates the glass workpiece, including compensation for reduced bit length due to the wearing away of lip 61 with use.

Any tendency of the motor housing 70 and cylinder 110 to rotate, due to the rotation of internal shaft or spindle 55, relative to cylinder housing 50 is precluded by a torque pin 205. The torque pin 205 preferably has threads 206 at one end engaging a tapped bore 207 in the front motor plate 71 and locked in place by a jam nut 208. Alignment is maintained by inserting the pin 205 in a projection 210 on the cylinder housing 50 which may be bored and provided with an internal bushing 211. The torque pin 205 is thus free to move axially through bushing 211 as the drill bit 60 is advanced and retracted.

It can be seen that the disclosed apparatus carries out the objects of the invention set forth above. Since various modifications in details, materials, and arrangements of parts are within the spirit of the invention herein disclosed and described, the scope of the invention should be limited solely by the scope of the attached claims.

I claim:

1. Apparatus for holding and boring a glass workpiece comprising, a cylinder housing means selectively positioned relative to the workpiece, spindle means carrying a glass drilling bit and movably mounted relative to said cylinder housing means, fluid operable motor means rotating said spindle at a preselected speed, fluid driven positioning means rapidly advancing said spindle means to a position proximate the workpiece and selectively controlling the rate of travel of the drilling bit through the workpiece, said fluid driven positioning means having cylinder means encasing said spindle means to form an annular channel therearound and supported within said cylinder housing means by front and rear sleeve means, said cylinder means having attached piston means disposed in a chamber formed between said cylinder housing means and said sleeve means for moving said cylinder means axially within said cylinder housing means, said chamber having a first fluid relief path formed by cylinder port means connecting said chamber and said annular channel and by output channel means connecting said annular channel to a sump outlet, said port means positioned to pass under said front sleeve means after a predetermined travel of said cylinder means to block said first fluid relief path, and a fluid input means supplying said motor means and said positioning means.

2. Apparatus according to claim 1 having a second fluid relief path comprising piston port means communicating with output duct means in said cylinder means connected to an output and control assembly.

3. Apparatus according to claim 2 having valve means in said output and control assembly for adjusting the rate of fluid flow in the second fluid relief path.

4. Apparatus according to claim 2, wherein said output and control assembly has sensor conduit means for determining fluid pressure in said assembly.

5. Apparatus according to claim 1 wherein said output and control assembly has spring loaded valve means providing a return flow of fluid for rapid retraction of the spindle means.

6. Apparatus according to claim 1 having depth adjustment means connected to said spindle means and restricting the travel of said spindle means relative to said cylinder housing means.

References Cited
UNITED STATES PATENTS

| | | | |
|---|---|---|---|
| 3,124,016 | 3/1964 | Reaser | 77—21 |
| 3,461,615 | 8/1969 | Ferguson | 125—20X |
| 2,454,235 | 11/1948 | Tomek | 77—32.8 |
| 2,941,338 | 6/1960 | Stantschi | 51—81 |
| 2,494,841 | 1/1950 | Svenson | 77—32.8X |
| 2,181,055 | 11/1939 | Hiruonen | 77—32.8X |
| 2,114,389 | 4/1938 | Kingsbury | 77—32.8 |

HAROLD D. WHITEHEAD, Primary Examiner

U.S. Cl. X.R.

125—20; 77—21